K. SZENTIVANYI.
HAT PIN POINT PROTECTOR.
APPLICATION FILED MAY 26, 1911.
1,010,978.
Patented Dec. 5, 1911.
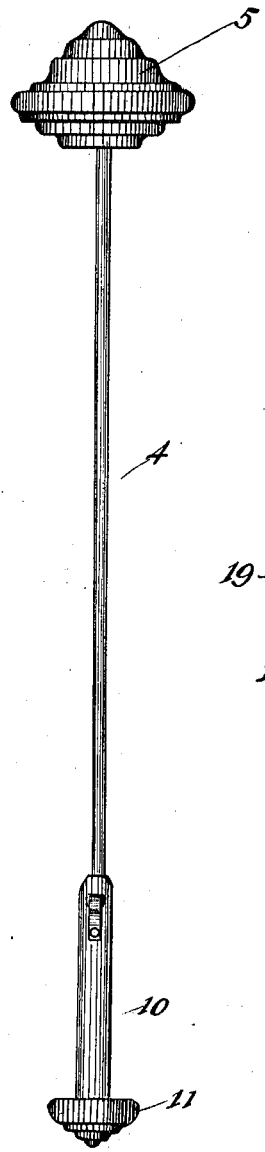
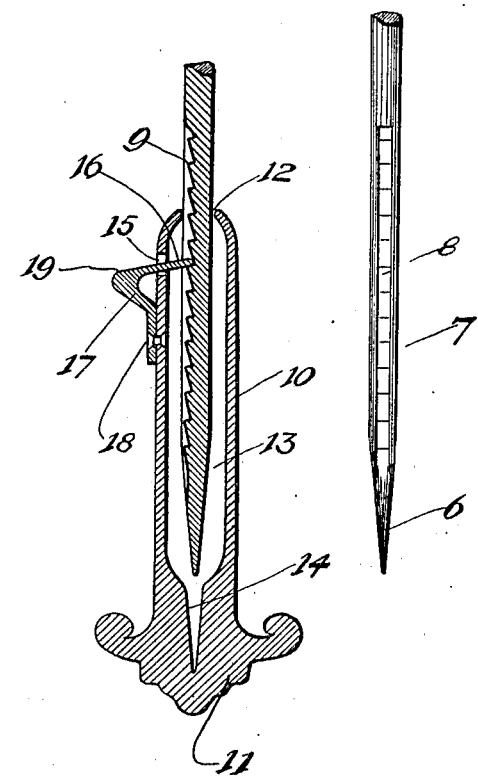
WITNESSES:
Erich Burkly
K. H. Butler
INVENTOR.
KALMAN SZENTIVANYI
BY
ATTORNEYS

UNITED STATES PATENT OFFICE.

KALMAN SZENTIVANYI, OF HARTFORD, CONNECTICUT, ASSIGNOR OF FIFTEEN ONE-HUNDREDTHS TO RUDOLPH F. HORVATH, OF HARTFORD, CONNECTICUT.

HAT-PIN-POINT PROTECTOR.

1,010,978.     Specification of Letters Patent.     Patented Dec. 5, 1911.

Application filed May 26, 1911. Serial No. 629,623.

*To all whom it may concern:*

Be it known that I, KALMAN SZENTIVANYI, a subject of the King of Hungary, residing at Hartford, in the county of Hartford and State of Connecticut, have invented certain new and useful Improvements in Hat-Pin-Point Protectors, of which the following is a specification, reference being had therein to the accompanying drawing.

This invention relates to hatpin point protectors, and the objects of my invention are to provide a simple and inexpensive device that can be easily placed upon the pointed end of a pin to prevent pedestrians from being injured when contacting with the pin, and to furnish the device with positive and reliable means, in a manner as will be hereinafter set forth for retaining it upon the end of the pin whereby the pin cannot become lost or displaced relatively to the hat in which it is mounted.

Further objects of my invention are to provide a strong and durable device of the above type that can be easily and quickly placed in engagement with the pointed end of a pin and to provide a hatpin point protector that is neat in appearance and susceptible to any desired ornamentation.

I attain the above objects by a mechanical construction that will be hereinafter specifically described and then claimed.

Reference will now be had to the drawing, wherein:—

Figure 1 is an elevation of the pin provided with the protector. Fig. 2 is an enlarged longitudinal sectional view of a portion of the same, and Fig. 3 is an enlarged elevation of a portion of the pin.

The reference numeral 4 denotes a pin having one end thereof provided with a head 5 and the opposite end pointed or tapered, as at 6, the pin corresponding to the ordinary and well known type at present used. The pointed end of the pin has a longitudinal groove 7 that is rectangular in cross section and has the outer end thereof terminating at the point of the pin. The bottom of the groove 7 is provided with teeth 8 of a less depth than the groove, the upper edges or shoulders 9 of the teeth being removed from the surface of the pin whereby the teeth will not interfere with the insertion of the pin in a hat.

The reference numeral 10 denotes a cylindrical hollow guard body having the outer end thereof provided with a head 11 and the upper end thereof reduced to form a small central opening 12 of a less diameter than the bore 13 of the guard body. The opening 12 is adapted to receive the pointed end of the pin and the bottom of the bore 13 is reduced to form a tapering seat 14, which prevents the point of the pin from being injured by contacting with the head 11, should the body be pushed too far upon the pointed end of the pin. The taper of the seat 14 is smaller than the taper of the pointed end 6 of the pin, consequently the pointed end of the pin cannot completely seat and when engaging in the seat the point will be at a point removed from the bottom of the seat.

The guard body 10 adjacent to the inner reduced end thereof is provided with an opening 15 and extending into said opening is a resilient end 16 of a resilient catch 17 riveted or otherwise connected, as at 18, to the guard body 10. The catch 17 has a thick or enlarged portion 19 that serves functionally as a finger grip for moving the catch, and it is preferable to make the inner end of the catch more resilient than the remaining portion of the catch, whereby the inner end will more readily yield when the guard body is placed upon the pointed end of the pin. As the guard body is placed over the pointed end of the pin, the inner end of the catch recedes over the teeth 8 and eventually engages one of the shoulders 9 to retain the pin within the guard body. When the catch is pulled outwardly the pin is immediately released and can be withdrawn from the guard body or the guard body will move from the end of the pin. The groove 7 prevents the guard body from rotating upon the pin, consequently the catch of the body cannot be accidentally shifted out of engagement with the teeth 8 by a rotated movement of the guard body relatively to said pin.

What I claim is:—

A hat pin point protector comprising a cylindrical pin having a tapering end provided with a longitudinal groove substantially rectangular in cross-section, the bottom wall of said groove being provided with teeth, a guard body having a longitudinal bore for the reception of the pointed end of the pin and further having a tapering seat to prevent the point of the pin from being injured, said body having an opening formed in one side near its inner end, and a catch including a longitudinally extending fixed end portion, an inwardly extending resilient end portion and further having an outwardly-extending angularly-disposed enlarged intermediate portion constituting a finger grip, said end portion secured to the periphery of said body in proximity to said opening and said resilient portion disposed at substantially right angles with respect to said fixed portion and extending through said opening and adapted to engage in one of said teeth to arrest outward movement of the pin.

In testimony whereof I affix my signature in the presence of two witnesses.

KALMAN SZENTIVANYI.

Witnesses:
 JOSEPH S. KORVATT,
 JOSEPH HOPER.

Copies of this patent may be obtained for five cents each, by addressing the "Commissioner of Patents, Washington, D. C."